United States Patent
Dull et al.

(10) Patent No.: US 6,954,003 B2
(45) Date of Patent: Oct. 11, 2005

(54) MOBILE, SELF-SUFFICIENT OPERATING ASSEMBLY FOR PROVIDING ELECTRICAL ENERGY

(75) Inventors: Sebastian Dull, Schönaich (DE); Albert Fritzsche, Markdorf (DE); Andreas Serden, Meersburg (DE); Günther Waschilewski, Neukirch (DE)

(73) Assignee: EADS Deutschland GmbH, Ottobrunn (DE)

(*) Notice: Subject to any disclaimer, the term of this patent is extended or adjusted under 35 U.S.C. 154(b) by 0 days.

(21) Appl. No.: 10/700,468

(22) Filed: Nov. 5, 2003

(65) Prior Publication Data

US 2005/0012336 A1 Jan. 20, 2005

(30) Foreign Application Priority Data

Nov. 7, 2002 (DE) .......................... 102 51 833

(51) Int. Cl.[7] .................................. H02J 9/08
(52) U.S. Cl. ..................... 290/4 R; 290/4 C; 74/661
(58) Field of Search .......................... 290/1 A, 4 R, 290/4 C; 74/661; 60/717, 718; 89/36.08

(56) References Cited

U.S. PATENT DOCUMENTS

| | | | | |
|---|---|---|---|---|
| 2,184,764 A | * | 12/1939 | Buff | 440/3 |
| 2,223,703 A | * | 12/1940 | Potez | 290/4 C |
| 2,455,070 A | * | 11/1948 | Malcolm | 307/57 |
| 3,478,619 A | * | 11/1969 | Shibata | 74/661 |
| 3,487,721 A | * | 1/1970 | Hiersig et al. | 74/661 |
| 3,591,843 A | * | 7/1971 | Friedrich | 290/4 R |
| 3,820,338 A | * | 6/1974 | Hiersig et al. | 60/717 |
| 4,979,362 A | * | 12/1990 | Vershure, Jr. | 60/788 |
| 5,239,830 A | * | 8/1993 | Banthin et al. | 60/718 |
| 5,861,569 A | * | 1/1999 | Abels | 89/36.08 |
| 5,899,411 A | * | 5/1999 | Latos et al. | 244/53 A |
| 6,691,806 B2 | * | 2/2004 | Wolfgang et al. | 180/6.7 |

FOREIGN PATENT DOCUMENTS

| | | | | |
|---|---|---|---|---|
| DE | 267607 | | 3/1927 | |
| DE | 2810792 B1 | | 7/1979 | |
| DE | 3741891 A1 | | 8/1989 | |
| DE | 4332378 A | | 3/1995 | |
| DE | 19944237 A1 | | 3/2001 | |
| EP | 249806 A1 | * | 12/1987 | B60K/5/08 |
| FR | 2510737 A1 | * | 2/1983 | F41H/7/02 |
| GB | 682881 | | 11/1952 | |
| WO | WO-9307016 A1 | | 4/1993 | |
| WO | WO 158743 A1 | * | 8/2001 | B62D/55/00 |

* cited by examiner

Primary Examiner—Joseph Waks
(74) Attorney, Agent, or Firm—Crowell & Moring LLP

(57) ABSTRACT

A mobile, self-sufficient operating assembly for providing electrical energy which includes two internal-combustion engines (21, 23) as well as two generators (22, 24). The internal-combustion engines (21, 23) and the generators (22, 24) being mutually connected by way of a transmission gearing (20) having several shifting clutches (4, 4', 5, 5'). Electrical control devices control the shifting clutches (4, 4', 5, 5') of the transmission gearing (20) whereby optionally each of the two internal-combustion engines (21, 23) or both internal-combustion engines (21, 23) together can drive each of the two generators (22, 24) or both generators (22, 24) together.

18 Claims, 3 Drawing Sheets

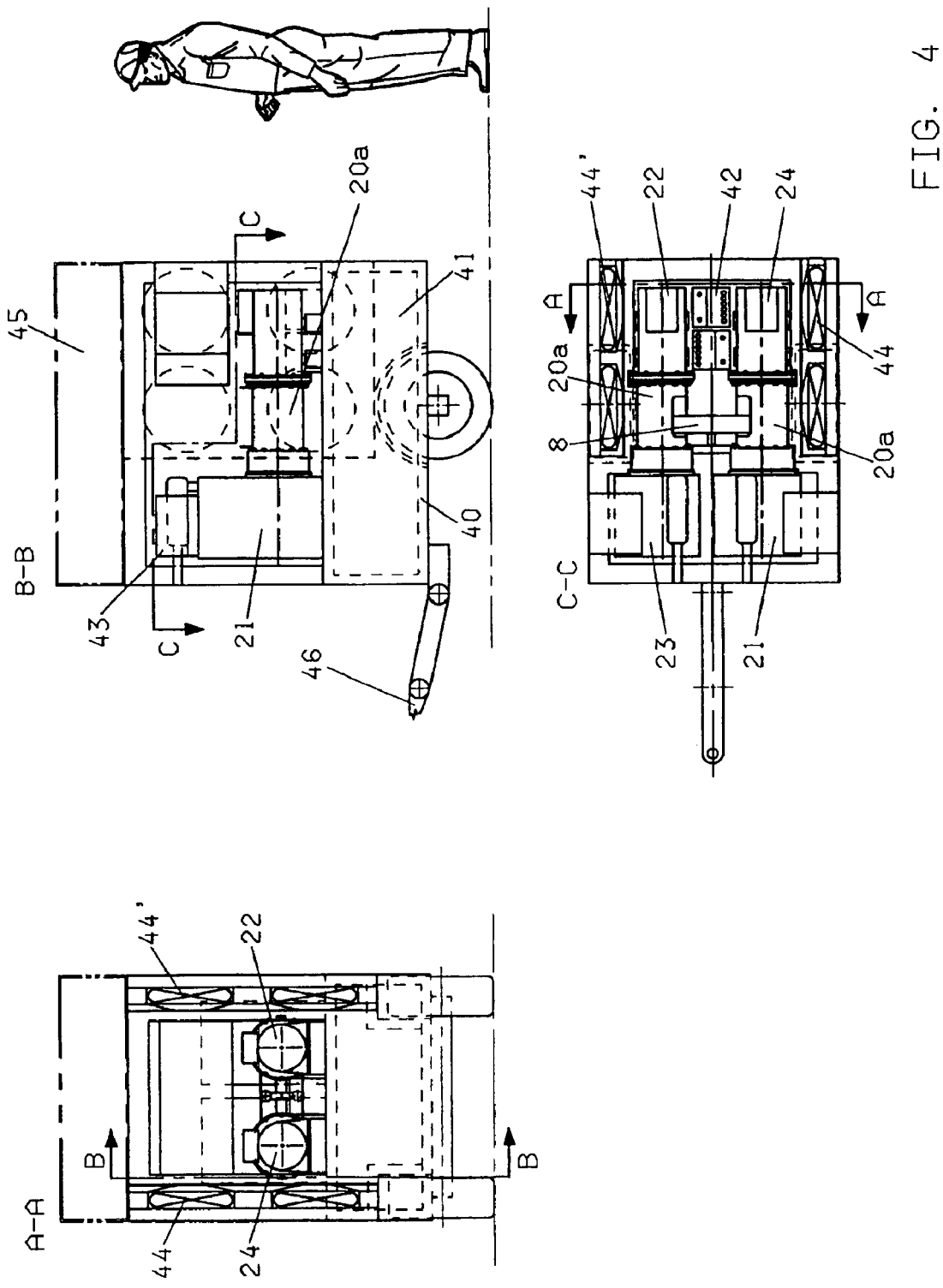

MOBILE, SELF-SUFFICIENT OPERATING ASSEMBLY FOR PROVIDING ELECTRICAL ENERGY

BACKGROUND AND SUMMARY OF THE INVENTION

This application claims the priority of Application No. 102 51 833.5-32, filed Nov. 7, 2002, in Germany, the disclosure of which is expressly incorporated by reference therein.

The invention relates to a mobile, self-sufficient operating assembly for providing electrical energy, for example, for supplying mobile first-aid stations.

Military tasks in the field of guidance and communication, particularly also sanitary services, which differ little from the civil application in the event of catastrophes, require highly mobile systems which are operable only by means of a reliable self-contained power supply. For higher power—150 Kw to a few MW, various manufacturers offer so-called power packs. They comprise the internal-combustion engine and generator components, which are both fixedly mounted usually in sound-proof containers, for example, for supplying power to construction sites and remote regions in the quasi-stationary operation. Smaller power units arranged on a base frame and characterized by considerable compactness are usually components of larger systems (no-break power supply, air conditioning, and others).

The more recent development of military power supply systems in the range from 1 to 60 Kw—even smaller units for the DC supply—attempt to provide reduction of weight and constructional volume, while saving fuel and increasing reliability. Here also, smaller aggregates form an independent transport unit or are installed in a space, the so-called technical area, which is separated from the working area of a container. An increased reliability (extension of the MTBF—Mean Time Between Failure—and reduction of the maintenance expenditures) is achieved by an ample dimensioning of all components and monitoring of the system-sensitive functions (temperatures, fuel supply and oil supply) by means of a corresponding modification of the COTS (Commercial Of The Shelf) products (stored-program control).

For the power supply of medical systems, a certain redundancy is demanded for safety reasons. A 100% redundancy would require at least a doubling of all components basically susceptible to disturbances. However, in the case of highly mobile systems, this is prevented by cost, an increased constructional volume and weight.

From British Patent Document GB 267,607 A, a power supply unit is known which consists of a generator as well as two or more internal-combustion engines, the generator and the internal-combustion engines being mutually connected by way of a gearing such that, as a function of the load, each individual internal-combustion engine or several of the internal-combustion engines together drive the generator.

When used in extreme environmental conditions, a rapid availability of the power supply and the safety of the operation may be crucial for a survival (for example, first-aid stations). This results in the object of supplementing the outlined development direction by creating a partial redundancy which is sufficiently dimensioned for supplying the medical systems necessary for survival. In this case, a significant increase of the system complexity and of the mechanical weight and constructional volume parameters has to be avoided. An expansion of the mobility by means of the capability to rapidly change the location by air transport or air drop also contributes to the reliability of the supply, The solution according to the invention is based on distributing the required nominal power of the power supply assembly to several, preferably two, identical partial assemblies with one internal-combustion engine and generator respectively (in the following, also called engine—generator aggregate) and to connect the outputs of the two internal-combustion engines by way of a gearing in a demand-controlled manner with one or the other or both generators. The signal for adjusting the operating mode is supplied by monitoring sensors of the consumer network, of the internal-combustion engines and of the generators.

In an advantageous embodiment, the requirement of reducing weight can be met by the use of common rail technology in the case of the internal-combustion engines, which results in a reduced fuel consumption.

The requirement concerning the air drop capability of the aggregate can advantageously be met by the arrangement of suitable shock absorbers together with a torque-free fastening of all components.

A particularly advantageous, very compact aggregate, for example, for mounting on a Europallet (1,600×1,200 mm) or arranged in a technical area of a container (shelter), can be implemented in that the two partial assemblies are arranged parallel, thus side-by-side or above one another. However, the arrangement in an engine-generator-generator-engine series is also conceivable. Although the latter requires only clutches, it does require right-hand rotating and left-hand rotating engines and the dimensioning of the generator shafts for twice the torque.

The solution of the gearing connecting the outputs of both engines according to the invention permits the following operating variants of the torque transmission:

Linear Diesel 1 drives generator 1 and
  diesel 2 drives generator 2
crosswise diesel 1 drives generator 2 or
  diesel 2 drives generator 1
combined diesel 1 drives generator 1 and generator 2 or
  diesel 2 drives generator 1 and generator 2 or
  diesel 1 and 2 drive generator 1 and/or 2.

When, in this case, the internal-combustion engine is called a diesel engine, this corresponds to military supply logistics. The described system concept basically also applies to the use of other internal-combustion engines, such as gasoline and gas engines or micro turbines.

In the simplest case, the generator and the engine rotate at the same rotational speed (50 Hz/3,000 r.p.m, 60 Hz/3,600 r.p.m.), but a step-down/step-up gearing can also be connected between the engine output and the connection gearing, or pole-changing generators can be used. In each case, it makes sense to transmit the torque of the engine by way of a centrifugal clutch in order to facilitate its start, absorb load impacts and compensate tolerances of the misalignment of the shaft. The transmission or branching of the torque takes place by two electric clutches (engine side, generator side) for each partial assembly. When the engine-side clutch remains open, the idler shaft between the centrifugal clutch and the generator-side clutch (closed) transmits the torque to the opposite generator. When the engine-side clutch is closed, a pulley disposed on the idler shaft rotates along and transmits the torque (completely or partially) to the correspondingly coupled second partial assembly.

One or both of the tension pulleys of the flat-belt drive or toothed-belt drive required for both directions of the torque transmission, in a supplementary manner provided with another clutch, can be utilized as an auxiliary output for a water or fuel pump or a refrigerant compressor. The connection of a separate-network-fed electric motor can also be used as the auxiliary drive, in which case the described assembly, while the internal-combustion engines are disengaged, will then operate as an electromechanical transducer.

Finally, the arrangement of a third engine-generator assembly can be used as another variant with, the connecting belt then running by way of three pulleys. With respect to the partial redundancy, there is the advantage of a power availability of 67% in the event of the disturbance of an engine—generator unit.

As an alternative, when a third engine-generator assembly is used, two of these partial assembly respectively can be connected by way of a belt drive. Here, in the case of a partial assembly, a second belt pulley, which can be connected for each clutch, is required on the idler shaft.

For generalizing the above-described embodiments, for the purpose of increasing the partial redundancy, more than three partial assemblies can also be used which can be coupled either by way of a joint belt drive or can each be coupled in pairs.

A preferred generator construction is the 230/400 V synchronous generator. Critical consuming devices are supplied from a battery-buffered 24 V dc-circuit. As an alternative, the required rectifier set can be fed by both generators.

According to DIN VDE 0107, the consuming devices are to be assigned to the following supply security classes:

Class 1: High-priority consuming devices
Class 2: Medium-priority consuming devices
Class 3: Low-priority consuming devices The currents (active components and reactive components) and the voltages of the three phases, the frequency, the power factor of the harmonic oscillations as well as the symmetrical load distribution are electronically detected as essential load and quality parameters and are compared with defined limit values (stored-program control). This ensures the early detection of developing disturbances and permits the advanced initiating of corresponding measures of the load management.

When one of the two internal-combustion engines fails, both generators are driven by the remaining internal-combustion engine. The high-priority energy supply is maintained, while the consuming devices with low priority can no longer be supplied. As an alternative, it is also possible to drive only one of the two generators by means of the remaining internal-combustion engine and to remove the other from the network.

If generator 1 fails, the high-priority power supply takes place by generator 2 and vice-versa, in which case a supplementary covering of the 24 V demand can temporarily take place from the battery. The remaining generator can be driven by one or by both internal-combustion engines. Although a doubling of the nominal power of each generator (which at first glance seems possible because both internal-combustion engines are still available for the operation) is possible as a further embodiment of the invention, on the whole, it results only in a relatively inefficient improvement of the partial redundancy. The generators are certainly not the components most susceptible to disturbances. Furthermore, the constructional volume and the weight will increase quite significantly merely for a better control of this rare disturbance event.

The operation of the internal-combustion engines has to be monitored with respect to the rate of utilization, the cooling water and the exhaust gas temperature and should be compared as above with the programmed limit values.

If the optimal engine efficiency is in the partial load range, it may be expedient, with respect to the fuel consumption, to uniformly distribute the load to both engines. When the power demand is very low, the supply from the engine is improved again. It is useful to pay attention to approximately identical running times of both engines when distributing the load, also in order to observe the maintenance intervals. By means of the coupling according to the invention of both internal-combustion engines with both generators, an increased flexibility can be achieved here when using internal-combustion engines.

The preferably water-cooled diesel engines and aggregates are covered jointly by a sound-proof capsule. This is also advantageous in that the sensitive components of the system are protected from a contamination in the case of an by NBC attack. The cooling water circuits of the engine, the exhaust gas cooler, the generator and the interior compartment (radiation), which are separate for thermal reasons, are guided to joint heat exchanger units which, corresponding to their size, are cooled by several fans (preferably axial-flow fans) by means of ambient air. In order not to enlarge the construction volume of the entire system by the empty space for guiding the cooling air, the heat exchangers are movably linked to hinges and the cooling water is fed and removed through hoses.

The standards set for the truck, rail and air transport for possible occurring accelerations in the longitudinal, transverse and vertical direction require a shock-absorbing fastening of all components, mainly in such a manner that acceleration forces provide no additional momentum to the fastening elements. Operation-caused vibrations must not be transmitted to the environment, particularly not to a form-lockingly adjacent operating space. The load situation of the air drop can be taken into account by the dimensioning of the shock and vibration absorbers. If this is not possible or not expedient from a dynamic or constructive point of view, the basic frame of the assembly can be placed on a platform which itself is shock-absorbing.

On the whole, the invention provides an aggregate by means of which a high reliability of the power supply can be achieved without significantly having to increase the construction volume and own weight.

Other objects, advantages and novel features of the present invention will become apparent from the following detailed description of the invention when considered in conjunction with the accompanying drawings.

BRIEF DESCRIPTION OF THE DRAWINGS

FIG. 4 consists of three views of the entire assembly mounted on a trailer.

DETAILED DESCRIPTION OF THE PREFERRED EMBODIMENT

Figure 1:
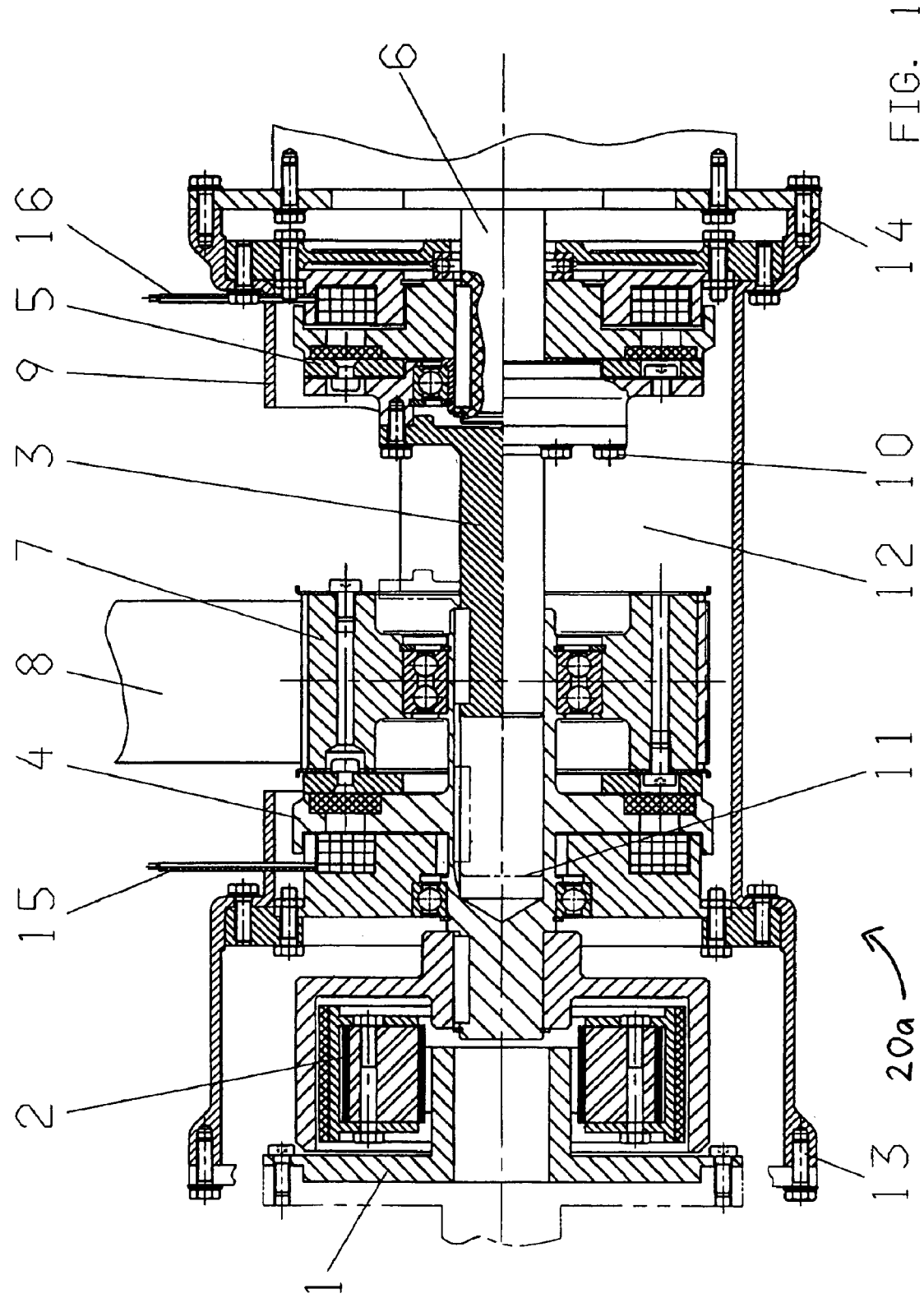
FIG. 1 is a longitudinal sectional view of a partial gearing arranged between the internal-combustion engine and the generator of a partial assembly.

The transmission gearing for the selective torque transmission from one of the two internal-combustion engines to one or both generators includes two partial gearings which can be coupled by way of a belt drive and are arranged parallel to one another. The partial gearings have an essentially identical construction. FIG. 1 is a longitudinal sectional view of such a partial gearing 20a. The output shaft of the internal-combustion engine introduces the torque into the disk 1 with the hub. The—optional—centrifugal clutch 2 engages after the nominal rotational speed has been reached and thereby transmits the torque to the gear shaft 3 and the engine-side shifting clutch 4. When the generator arranged in line is to be driven, the clutch 4 remains open (not activated electrically or only quiescent current) and the generator-side shifting clutch 5 has to close. The torque is thereby transmitted to the generator shaft 6.

When only the generator situated in parallel is to be driven, the engine-side clutch 4 has to close and the generator-side clutch 5 has to open. As a result, the belt wheel 7 will rotate along and the belt 8, here illustrated as a toothed belt, transmits the engine power to the second generator. The gear housing is broken open at the point indicated by reference number 9. If it becomes necessary to change the belt, the screwed connection 10 has to be unscrewed and the gear shaft 3 has to be shifted into the position 11 indicated by the broken line. By means of the resulting free space 12, the belt 8 can be withdrawn and removed from the belt wheel 7 and a new belt can mounted.

By means of the flanges 13 and 14, the gear housing is rigidly fastened to the internal-combustion engine and to the generator, whereby a compact unit is obtained. Reference numbers 15 and 16 indicate the current feed of the shifting clutches.

Figure 2:
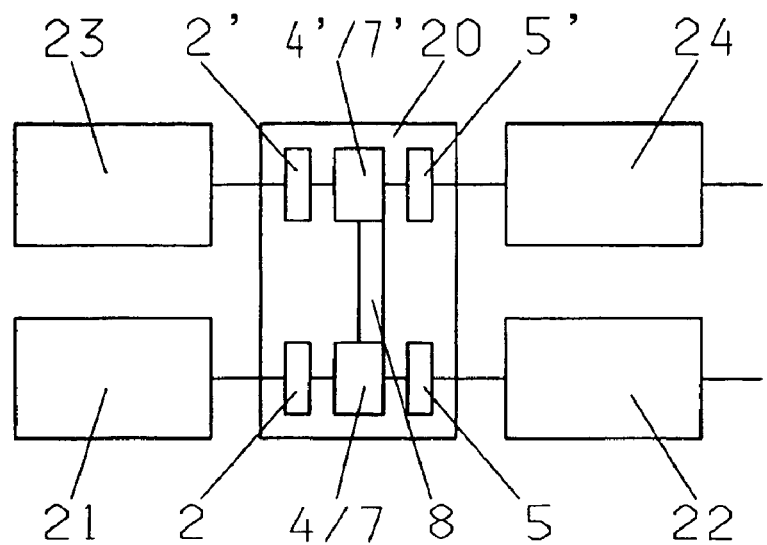
FIG. 2 is a schematic view of an embodiment of the entire assembly consisting of two partial assemblies whose gearings are connected with one another.

The schematic view of FIG. 2 indicates the mechanical construction of the overall assembly. It includes two internal-combustion engines 21, 23 which are connected with the two generators 22, 24 by way of the transmission gearing 20. The transmission gearing 20 comprises two examples of a partial gearing 20a which are illustrated in FIG. 1 and which can be coupled by means of belts 8. When the rotational speed of the engines 21 and 23 differs from that of the generators 22 and 24, a step-up/step-down gearing, which is not shown here, has to be inserted between the centrifugal clutches 2 and 2' and the engine-side shifting clutches 4, 4'. The toothed belt 8 connects the belt pulleys 7 and 7' connected with the output side of the engine-side shifting clutches 4 and 4'. The generator-side shifting clutches 5 and 5' are assigned to the generators 22 and 24.

The targeted controlling of the shifting clutches 4, 4', 5, 5' therefore results in the demanded operating modes of the internal-combustion engines and generators, specifically
  the driving of both generators by means of one of the two internal-combustion engines;
  the driving of one generator by means of the internal-combustion engine situated in line;
  the driving of one generator by means of the internal-combustion engine situated in parallel;
  the driving of one and/or both generators by means of both internal-combustion engines in a compound manner.

Figure 3:
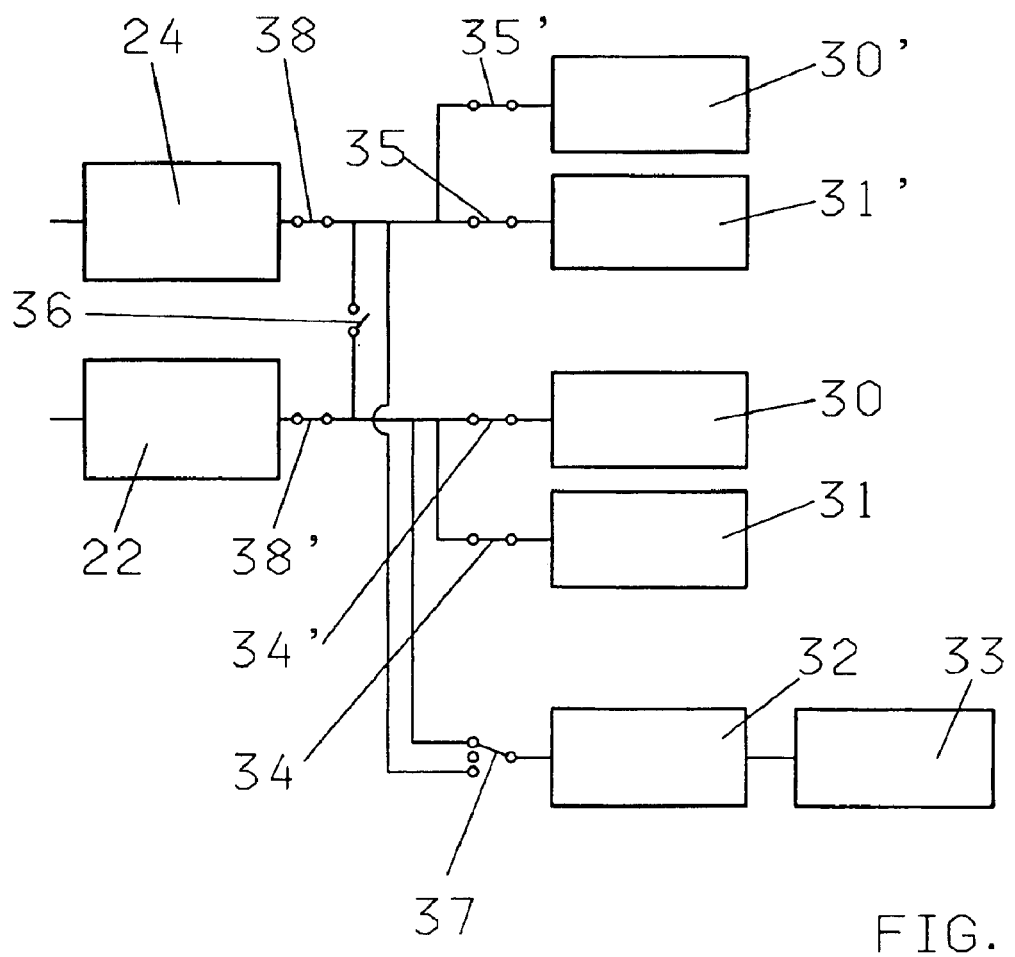
FIG. 3 is a block diagram of the power distribution for ac- and dc-consuming devices.

FIG. 3 indicates the current distribution of the two generators 22 and 24 to the assigned networks 30 and 30' (high-priority ac-networks), and 31 and 31' (low-priority networks). The switches 34 and 34', 35 and 35' are closed, as illustrated, when the assigned generator 22 and 24 respectively are available at full power. In this case, the switch 36, which permits the electrical connection of the two partial networks, is open.

When one of the two internal-combustion engines fails, the two generators 22, 24 are preferably driven by the remaining internal-combustion engine. Despite the reduced available power, the supply of the high-priority networks 30, 30' is maintained (switches 34', 35' closed); the low-priority networks 31, 31' are switched off (switches 34, 35 open).

When one of the generators fails (for the following example, generator 22), generator 24 takes over the supply of the high-priority networks 30, 30' (switches 34', 35' and 36 closed), while the low-priority networks 31, 31' are switched off (switches 34, 35 open). The generator 22 is taken off the network by means of switch 38'.

Dc-consuming devices 33 are supplied by way of the rectifier module 32. In this case, the change-over switch 37 provides that the ac-current supply, as an alternative, can take place from only one generator. The switch-over operation can be bridged by a battery buffer.

FIG. 4 contains three views of an example of an overall construction of a power supply system, here in a mobile construction. The base of the single-axle trailer 40 corresponds to the dimensions of two Europallets. In order to achieve a favorable center-of-gravity position of the useful load in the fully-tanked condition, the engines 21 and 23 with the generators 22 and 24 are arranged on the top side of the fuel tank 41. The two-part transmission gearing 20 with the belt 8 (FIG. 1) forms the center part of the power generating assembly.

Important additional components are the battery bank, the by NBC-tight and sound-proof capsule 43 of the water-cooled engines, the exhaust gas coolers as well as the generators. The water cooling of the engines preferably takes place in thermally separated circuits which are guided to the exterior air-cooled heat exchangers with fans 44, 44'. In the interest of compactness and the capability to decontaminate by NBC-warfare agents of the overall system, the heat exchangers are folded-out for the operation.

In order to permit a longer system operation, that is, an operation lasting several days, without any fuel replacement, another tank 45 can be placed atop the system.

As a function of the construction of the load parachute, the capability to be air-dropped is ensured by the arrangement of suitably dimensioned vibration absorbers between the components and the base frame and, if required, by means of an intermediate plate (not shown here) under the fuel tank for absorbing the kinetic energy.

The limited cargo space for air freight requires the lifting-off or folding-up of the height-adjustable hitch 46.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A mobile, self-sufficient operating assembly for providing electrical energy, comprising;
  two internal-combustion engines and two generators wherein the internal-combustion engines and the generators are mutually connected by way of a transmission gearing comprising several shifting clutches, and
  electrical control devices for controlling the several shifting clutches of the transmission gearing wherein is a first condition each of the two internal-combustion engines drive a respective one of said two generators, in a second condition both internal-combustion engines together drive each of the two generators and, in a third condition one of said internal combustion engines drive both generators together, wherein the transmission gearing comprises two essentially identically constructed partial gearings, one partial gearing comprising an engine-side shifting clutch and a generator-side shifting clutch. which are arranged in line with respect to one of said two internal-combustion engines and one of said two generators respectively, wherein the two partial gearings are capable of being coupled by way of a belt drive at an output side of the two engine-side shifting clutches.

2. The assembly according to claim 1, wherein shifting signals of the control devices for the shifting clutches are derived from power demand, assembly monitoring, and disturbance signals of the assembly operation.

3. The assembly according to claim 2, wherein tension pulleys of the belt drive are constructed as an auxiliary output for another processing machine.

4. The assembly according to one of claim 2, wherein the belt drive is driven by means of an external-network-fed electric motor whereby the aggregate operates as an electromechanical transducer.

5. The assembly according to claim 2, wherein at least one other partial assembly consisting of one of the internal-combustion engines, one of the generators and the partial gearing, is arranged in parallel and wherein the partial gearings are capable of being coupled by way of a common belt.

6. The assembly according to claim 1, wherein tension pulleys of the belt drive are constructed as an auxiliary output for another processing machine.

7. The assembly according to one of claim 6, wherein the belt drive is driven by means of an external-network-fed electric motor whereby the aggregate operates as an electromechanical transducer.

8. The assembly according to claim 6, wherein at least one other partial assembly consisting of one of the internal-combustion engines, one of the generators and the partial gearing, is arranged in parallel and wherein the partial gearings are capable of being coupled by way of a common belt.

9. The assembly according to one of claim 1, wherein the belt drive is driven by means of an external-networked-fed electric motor whereby the assembly operates as an electromechanical transducer.

10. The assembly according to claim 9, wherein at least one other partial assembly consisting of one of the internal-combustion engines, one of the generators and the partial gearing, is arranged in parallel and wherein the partial gearings are capable of being coupled by way of a common belt.

11. The assembly according to claim 1, wherein at least one other partial assembly consisting of one of the internal-combustion engines, one of the generators and the partial gearing, is arranged in parallel and wherein the partial gearings are capable of being coupled by way of a common belt.

12. The assembly according to claim 1, wherein said at least one partial gear of the assembly has an additional shifting clutch.

13. The assembly according to claim 1, wherein shifting signals of the control devices for the shifting clutches are derived from power demand, assembly monitoring, and disturbance signals of the assembly operation.

14. The assembly according to claim 1, wherein at least one other partial assembly consisting of one of the internal-combustion engines, one of the generators and the partial gearing, is arranged in parallel and wherein the partial gearings are capable of being coupled by way of a common belt.

15. An electrical energy device comprising:
two engines;
two generator;
transmission gearing for connecting together said two engines and said two generations; and
control means for controlling said transmission gearing to provide a first condition wherein any one of said two engines drive any one of said two generators, a second condition wherein any one of said two engines drives both of said generators, and a third condition wherein both of said engines together drive at least one of said generators, wherein
the transmission gearing comprises two essentially identically constructed partial gearings, one partial gearing comprising an engine-side shifting clutch and a generator-side shifting clutch, which are arranged in line with respect to one of said two internal-combustion engines and one of said two generators respectively, wherein the two partial gearings are capable of being coupled by way of a belt drive at an output side of the two engine-side shifting clutches.

16. The assembly according to claim 15, wherein shifting signals of the control devices for the shifting clutches are derived from power demand, assembly monitoring, and disturbance signals of the assembly operation.

17. The assembly according to claim 15, wherein tension pulleys of the belt drive are constructed as an auxiliary output for another processing machine.

18. The assembly according to claim 15, wherein the belt drive is driven by means of an external-network-fed electric motor, whereby the assembly operates as an electromechanical transducer.

* * * * *